United States Patent
Kim et al.

(10) Patent No.: US 10,870,429 B2
(45) Date of Patent: Dec. 22, 2020

(54) POSTURE INFORMATION BASED PEDESTRIAN DETECTION AND PEDESTRIAN COLLISION PREVENTION APPARATUS AND METHOD

(71) Applicants: HYUNDAI MOTOR COMPANY, Seoul (KR); KIA MOTORS CORPORATION, Seoul (KR)

(72) Inventors: Yoon Soo Kim, Suwon-si (KR); Eung Seo Kim, Suwon-si (KR); Suk Ki Min, Suwon-si (KR); Dong Hyun Sung, Hwaseong-si (KR); Seung Wook Park, Yongin-si (KR); Yong Seok Kwon, Suwon-si (KR); Sang Min Lee, Seoul (KR); Tae Young Lee, Yongin-si (KR); Min Byeong Lee, Seongnam-si (KR); Ho Choul Jung, Suwon-si (KR); In Yong Jung, Suwon-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 16/559,071

(22) Filed: Sep. 3, 2019

(65) Prior Publication Data
US 2019/0389458 A1  Dec. 26, 2019

Related U.S. Application Data

(63) Continuation of application No. 15/833,667, filed on Dec. 6, 2017, now Pat. No. 10,435,018.

(30) Foreign Application Priority Data

Dec. 30, 2016  (KR) .................. KR10-2016-0184290

(51) Int. Cl.
*B60W 30/09*  (2012.01)
*B60W 30/095*  (2012.01)
(Continued)

(52) U.S. Cl.
CPC ............... *B60W 30/09* (2013.01); *B60T 7/22* (2013.01); *B60W 30/0953* (2013.01);
(Continued)

(58) Field of Classification Search
None
See application file for complete search history.

(56) References Cited

U.S. PATENT DOCUMENTS 9,446,765 B2   9/2016  Ben Shalom et al.
9,605,971 B2   3/2017  Niehsen et al.
(Continued)

FOREIGN PATENT DOCUMENTS

DE   10 2010 053 350 A1   6/2012
DE   10 2011 112 985 A1   3/2013
(Continued)

OTHER PUBLICATIONS

Office Action issued in corresponding Korean Patent Application No. 10-2016-0184290 dated Feb. 21, 2019, with English translation.
(Continued)

*Primary Examiner* — Peter D Nolan
*Assistant Examiner* — Demetra R Smith-Stewart
(74) *Attorney, Agent, or Firm* — Morgan, Lewis & Bockius LLP

(57) ABSTRACT

An apparatus for activating a pedestrian detection and collision mitigation system (PDCMS) of a vehicle includes: a front detection sensor detecting a presence of a pedestrian on a driving lane of the vehicle, gaze information of the pedestrian, and a distance and a relative speed between the pedestrian and the vehicle; a vehicle sensor detecting at least
(Continued)

any one of a speed, an acceleration, a steering angle, a steering angular velocity, or a pressure of a master cylinder of the vehicle; an electronic control unit activating a PDCMS function based on information detected by the front detection sensor and the vehicle sensor; and a warning unit operated to inform a driver of a collision of the pedestrian with the vehicle by a control of the electronic control unit.

15 Claims, 10 Drawing Sheets

(51) Int. Cl.
*G06K 9/00* (2006.01)
*B60T 7/22* (2006.01)
*G08G 1/16* (2006.01)
*B60W 50/14* (2020.01)

(52) U.S. Cl.
CPC ..... *B60W 30/0956* (2013.01); *G06K 9/00268* (2013.01); *G06K 9/00369* (2013.01); *G06K 9/00805* (2013.01); *G08G 1/166* (2013.01); *B60T 2201/022* (2013.01); *B60W 2050/143* (2013.01); *B60W 2050/146* (2013.01); *B60W 2420/42* (2013.01); *B60W 2520/10* (2013.01); *B60W 2554/00* (2020.02); *B60W 2555/20* (2020.02); *B60W 2710/182* (2013.01); *B60W 2720/10* (2013.01)

(56) References Cited

U.S. PATENT DOCUMENTS

| | | | |
|---|---|---|---|
| 9,751,534 B2 | 9/2017 | Fung et al. | |
| 10,435,018 B2* | 10/2019 | Kim | B60W 30/09 |
| 2008/0036576 A1* | 2/2008 | Stein | B60R 1/00 |
| | | | 340/425.5 |
| 2009/0018711 A1* | 1/2009 | Ueda | G08G 1/165 |
| | | | 701/1 |
| 2009/0192710 A1* | 7/2009 | Eidehall | B62D 15/0265 |
| | | | 701/301 |
| 2010/0253597 A1* | 10/2010 | Seder | G08G 1/165 |
| | | | 345/7 |
| 2011/0125372 A1 | 5/2011 | Ito | |
| 2012/0300078 A1 | 11/2012 | Ogata et al. | |
| 2014/0169624 A1 | 6/2014 | Jung | |
| 2014/0222280 A1* | 8/2014 | Salomonsson | B60T 7/22 |
| | | | 701/28 |
| 2014/0306814 A1 | 10/2014 | Ricci | |
| 2015/0161796 A1 | 6/2015 | Choi et al. | |
| 2018/0075309 A1* | 3/2018 | Sathyanarayana | G05D 1/0088 |
| 2018/0090008 A1* | 3/2018 | Ikenouchi | G08G 1/01 |

FOREIGN PATENT DOCUMENTS

| | | |
|---|---|---|
| JP | H06-107141 A | 4/1994 |
| JP | 2005-182452 A | 7/2005 |
| JP | 2006-163637 A | 6/2006 |
| JP | 2008-143372 A | 6/2008 |
| JP | 2008-282097 A | 11/2008 |
| JP | 2011-063187 A | 3/2011 |
| JP | 2011-225159 A | 11/2011 |
| JP | 2013-089129 A | 5/2013 |
| JP | 2014-059841 A | 4/2014 |
| JP | 2016-009251 A | 1/2016 |

OTHER PUBLICATIONS

Korean Office Action issued in Application No. 10-2016-0184290 dated Aug. 23, 2018.
Franke, Uwe et al., "Making Bertha See," 2013 IEEE International Conference on Computer Vision Workshops, pp. 214-221, 2013.
Extended European Search Report issued in European Application No. 17205457.9 dated Jun. 18, 2018.
Notice of Allowance issued in corresponding U.S. Appl. No. 15/833,667 dated May 31, 2019.
Non-Final Office Action issued in corresponding U.S. Appl. No. 15/833,667 dated Nov. 19, 2018.

* cited by examiner

[FIG. 1]
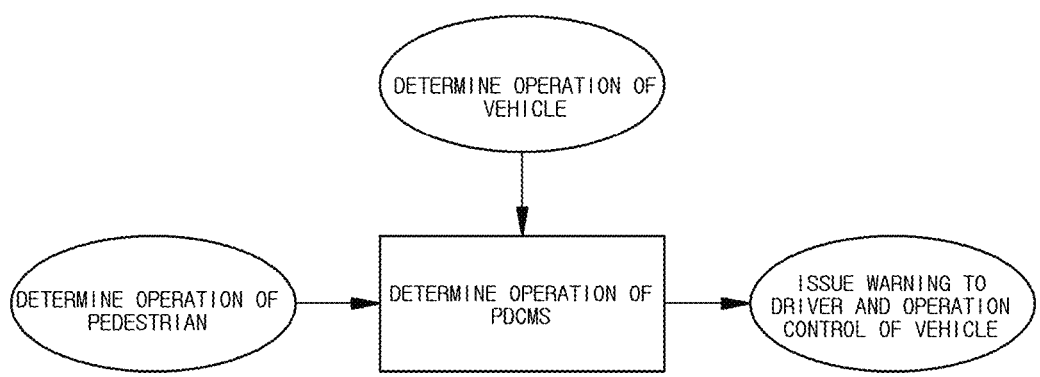
[FIG. 2]
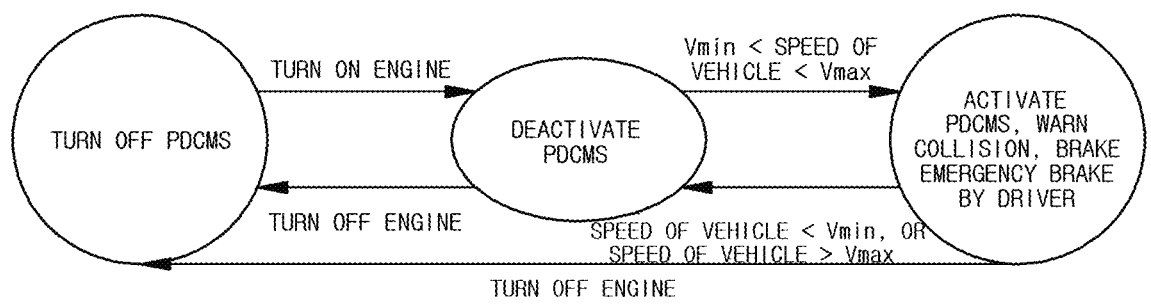

[FIG. 3]
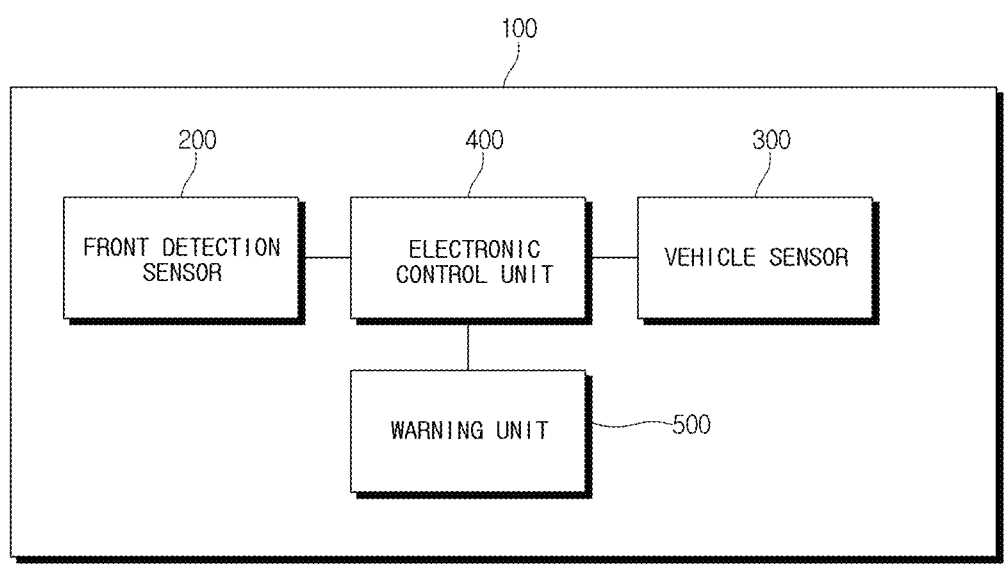

[FIG. 4]
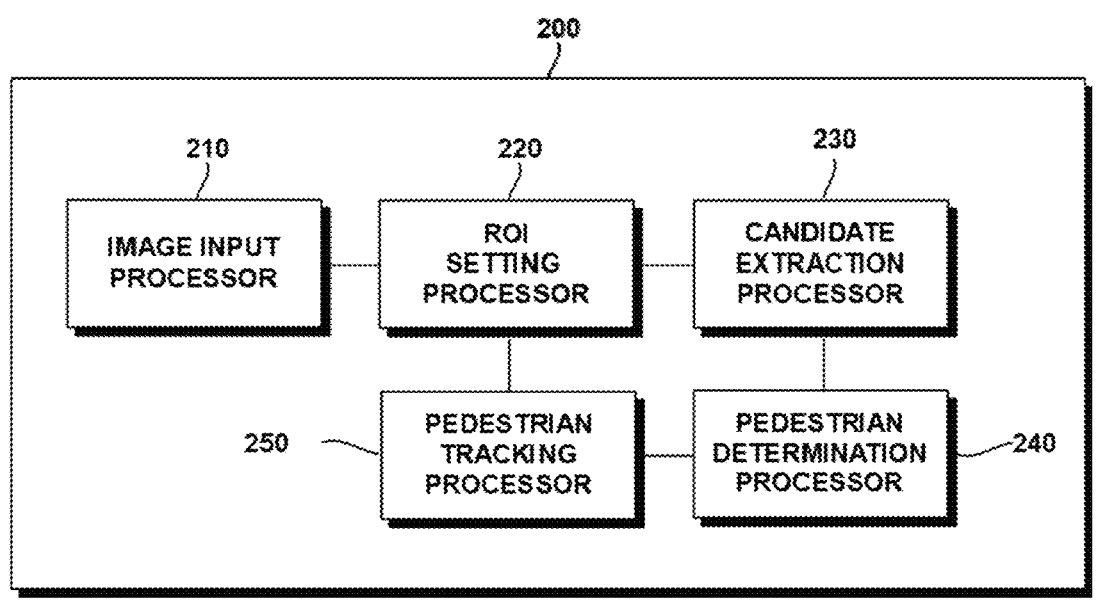

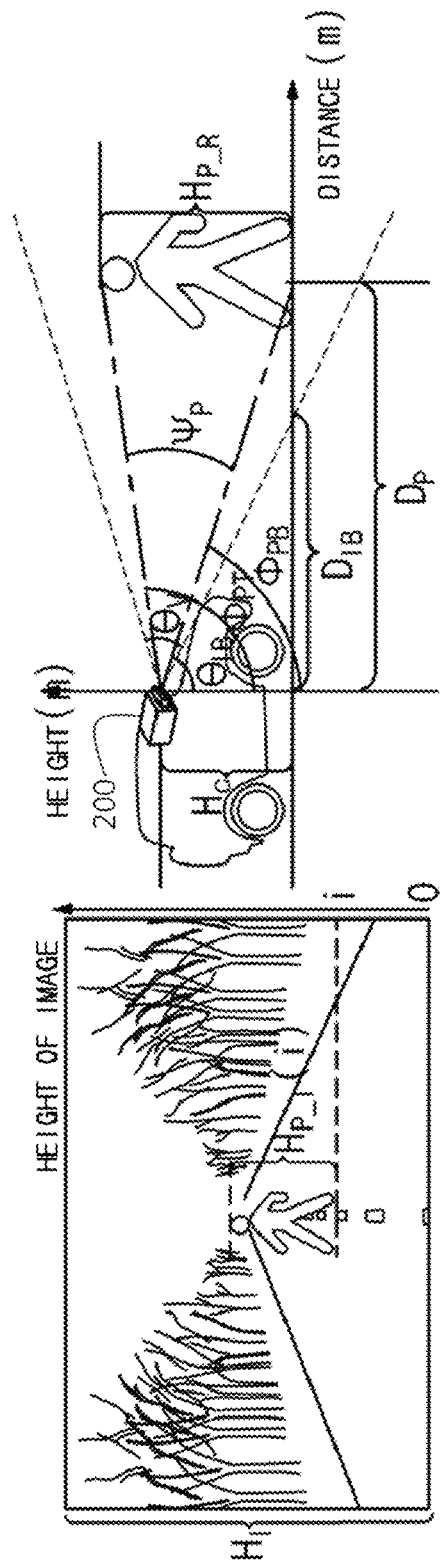
[ FIG. 5 ]

[FIG. 6]
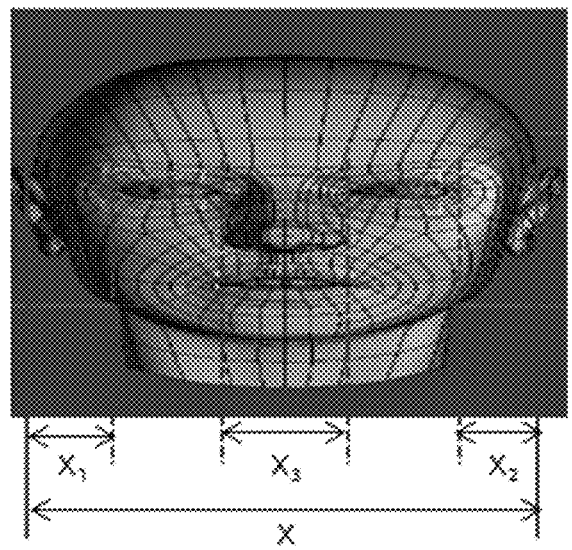
[FIG. 7]
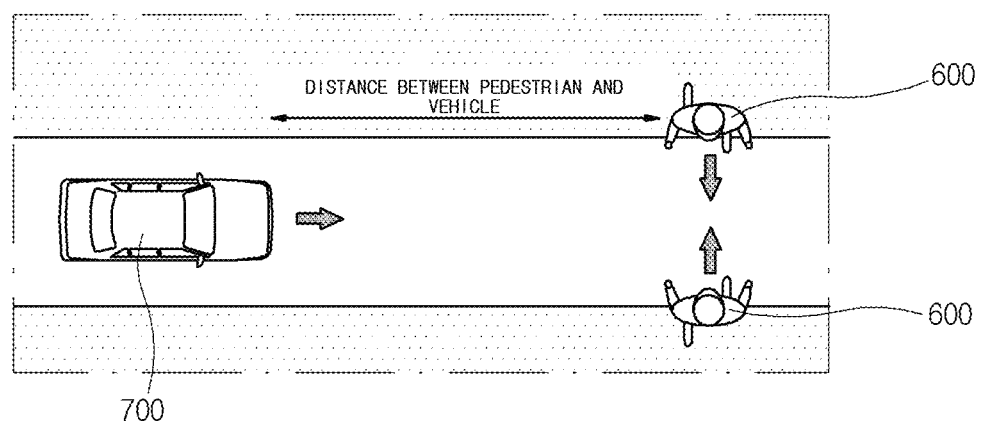

[FIG. 8]
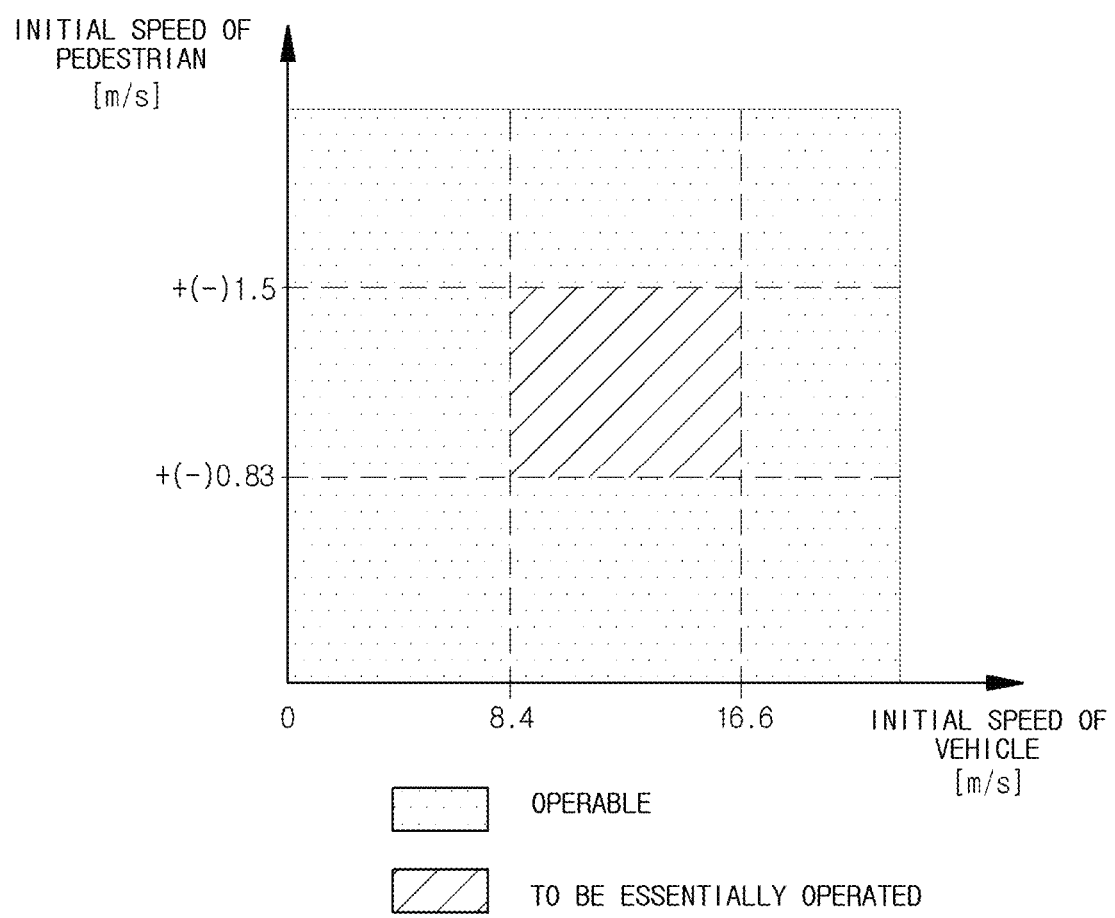

[FIG. 9]
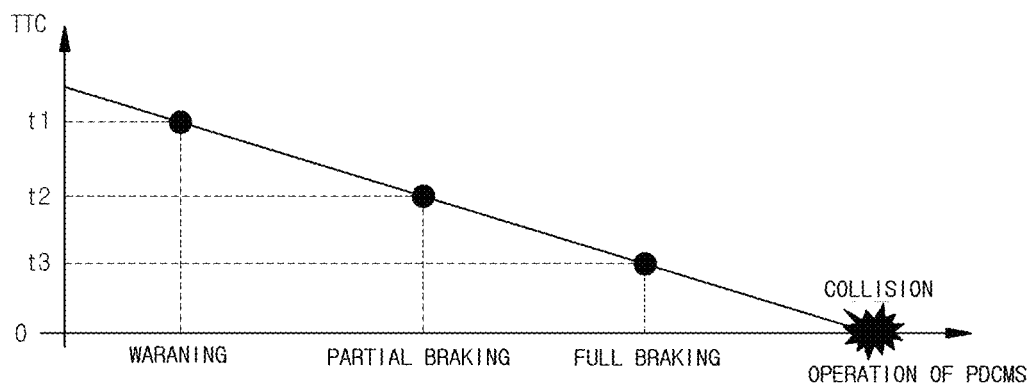
[FIG. 10A]   [FIG. 10B]   [FIG. 10C]
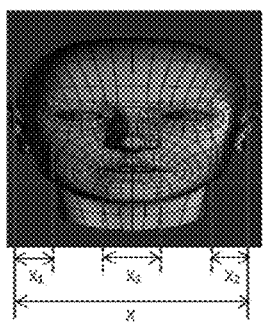 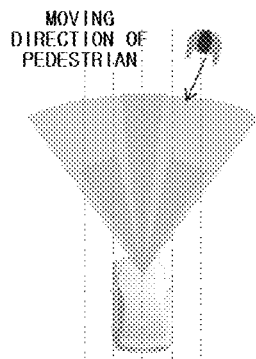 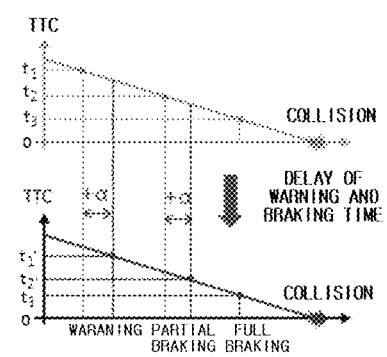

[FIG. 11A]
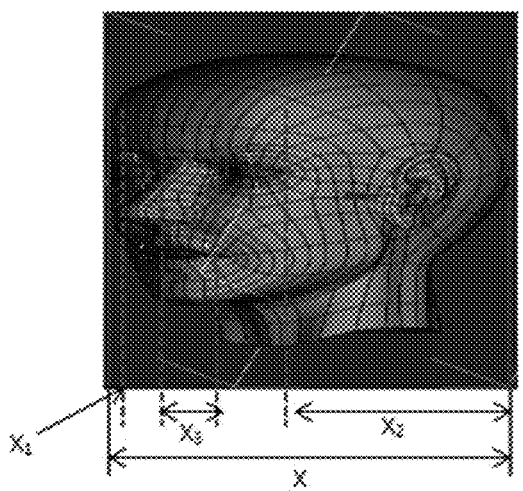
[FIG. 11B]
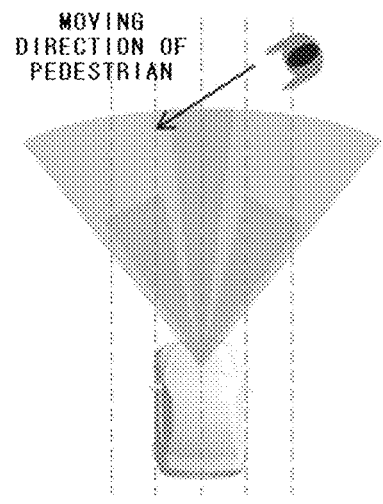
[FIG. 11C]
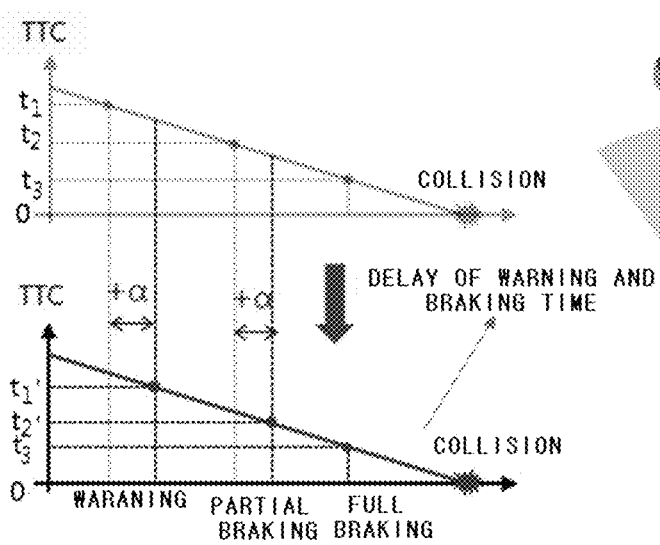
[FIG. 11D]
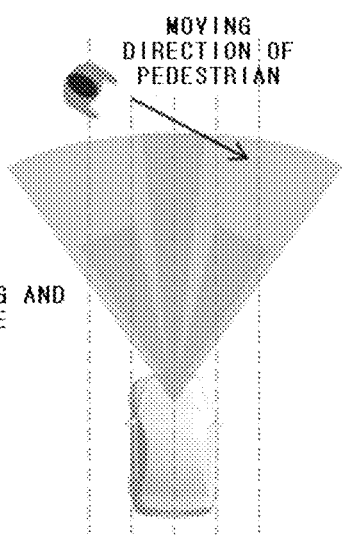

[FIG. 12A]
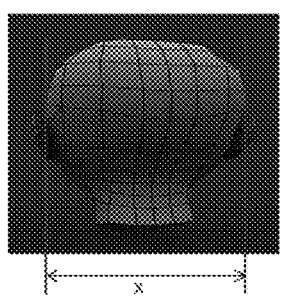
[FIG. 12B]
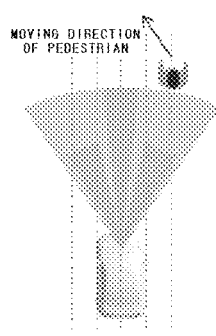
[FIG. 12C]
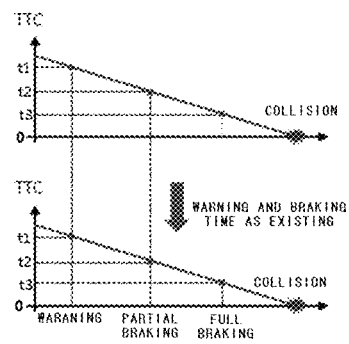
[FIG. 13A]
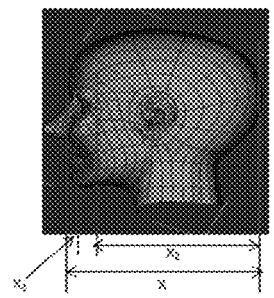
[FIG. 13B]
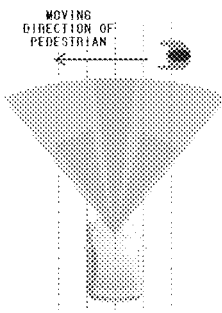
[FIG. 13C]
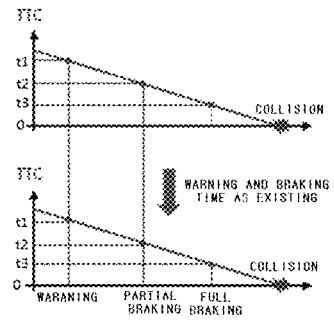

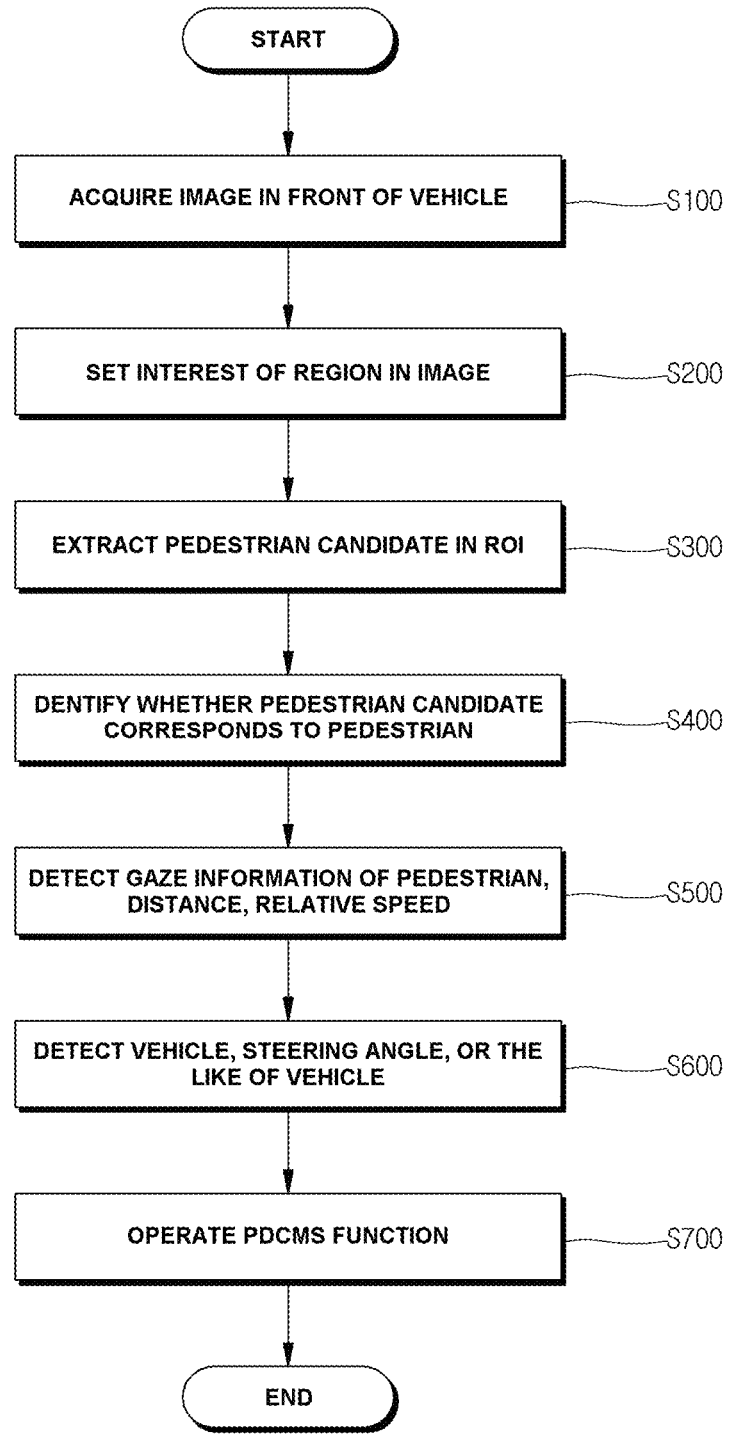
[FIG. 14]

POSTURE INFORMATION BASED PEDESTRIAN DETECTION AND PEDESTRIAN COLLISION PREVENTION APPARATUS AND METHOD

CROSS-REFERENCE TO RELATED APPLICATION

This application is the continuation application of U.S. patent application Ser. No. 15/833,667, filed on Dec. 6, 2017, now allowed, which claims the benefit of priority to Korean Patent Application No. 10-2016-0184290, filed on Dec. 30, 2016, the disclosure of which is incorporated herein by reference in its entirety.

TECHNICAL FIELD

The present disclosure relates to a pedestrian detection and a pedestrian collision prevention apparatus and method, and more particularly, to an apparatus and a method for activating a pedestrian detection and collision mitigation system (PDCMS) of a vehicle capable of recognizing a pedestrian by analyzing a posture of the pedestrian in an image in front of the vehicle and to protect a pedestrian by activating a PDCMS function when an accident is highly likely to occur by analyzing gaze information of the pedestrian.

BACKGROUND

Recently, advanced driver assistance systems (ADAS) have been developed to assist driving of a driver. The ADAS has multiple sub-technology categories. Among those, the ADAS includes a pedestrian detection and collision mitigation system (PDCMS).

The PDCMS is a technology that warns a driver of a pedestrian collision when a collision of a pedestrian with a vehicle is expected and automatically activates an emergency brake.

Lethality and injury rates of pedestrian-related traffic accidents are so high, which leads to a lot of life loss. The PDCMS system may help reduce a speed of the vehicle against inevitable pedestrian collisions, thereby alleviating pedestrian impacts and reducing the lethality and the injury rates.

Therefore, a technology development for specific application of the PDCMS has been required.

SUMMARY

An object of the present disclosure is to an apparatus for activating a pedestrian detection and collision mitigation system (PDCMS) including a front detection sensor capable of measuring a presence of a pedestrian and a distance and a relative speed between a vehicle and a pedestrian with higher accuracy, based on posture information of a pedestrian in an image in front of the vehicle.

Another object of the present disclosure is to provide a system for more safely protecting a pedestrian by accurately activating a PDCMS function.

Other objects and advantages of the present disclosure can be understood by the following description, and become apparent with reference to the embodiments of the present disclosure. Also, it is obvious to those skilled in the art to which the present disclosure pertains that the objects and advantages of the present disclosure can be realized by the means as claimed and combinations thereof.

In accordance with one aspect of the present disclosure, an apparatus for activating a pedestrian detection and collision mitigation system (PDCMS) of a vehicle includes: a front detection sensor detecting a presence of a pedestrian on a driving lane of the vehicle, gaze information of the pedestrian, and a distance and a relative speed between the pedestrian and the vehicle; a vehicle sensor detecting at least any one of a speed, an acceleration, a steering angle, a steering angular velocity, or a pressure of a master cylinder of the vehicle; an electronic control unit activating a PDCMS function based on information detected by the front detection sensor and the vehicle sensor; and a warning unit operated to inform a driver of a collision of the pedestrian with the vehicle by a control of the electronic control unit, in which the front detection sensor may include: an image input processor acquiring an image in front of the vehicle; an ROI setting processor setting a region of interest (ROI) corresponding to a size of an object in the image; a candidate extraction processor extracting a pedestrian candidate based on an operation of the object in the set ROI; and a pedestrian determination processor including a database and comparing the extracted pedestrian candidate with a posture of a sample pedestrian in the database to identify whether the extracted pedestrian candidate corresponds to the pedestrian, and the PDCMS function may include an activation of an operation of the warning unit and an activation of an operation of a brake regardless of whether the driver operates the brake and the activation of the operation of the warning unit and the activation of the operation of the brake may be performed in order of the operation of the warning unit, a partial braking of the vehicle, and a full braking of the vehicle.

The pedestrian determination processor may include the database and stores, as the posture of the sample pedestrian, information associated with at least one of front, back, left, and right portions, an upper left half of a body, and an upper right half of a body of the sample pedestrian in the database.

The pedestrian determination processor may compare the extracted pedestrian candidate with the front, back, left, and right portions, the upper left half of the body, or the upper right half of the body of the sample pedestrian in the database in a cascade manner.

The front detection sensor may further include a pedestrian tracking processor tracking the pedestrian identified by the pedestrian determination processor.

The pedestrian tracking processor may track the pedestrian based on the number of feature points of the pedestrian in the set ROI.

When a horizontal length of the entire face of the pedestrian is defined as x, a horizontal length from a left face contour to a left eye of the pedestrian is defined as $x_1$, a horizontal length from a right face contour to a right eye of the pedestrian is defined as $x_2$, and a horizontal length between the left eye and the right eye of the pedestrian is defined as $x_3$, the gaze information of the pedestrian may correspond to a front or a diagonal if $|(x_1-x_2)/x|<a$, a rear if $x_1=x_2=x_3=0$, and a side if $|(x_1-x_2)/x|\geq a$ or $x_1=0$ or $x_2=0$, and the a may be selected in a range between 0.65 and 0.95.

The electronic control unit may perform the activation of the operation of the warning unit and the activation of the operation of the brake by delaying the activation of the operation of the warning unit and the activation of the operation of the brake by a predetermined time when the gaze information of the pedestrian is the front or the diagonal, compared to when the gaze information of the pedestrian is the rear or the side.

The vehicle sensor may further include at least any one of a rain sensor, a temperature sensor, and an illumination sensor.

The electronic control unit may perform the activation of the operation of the brake so that the speed of the vehicle is reduced to at least a predetermined speed or more from time when the operation of the brake is activated to time when the collision of the pedestrian with the vehicle occurs.

The electronic control unit may permit the driver to operate the brake for a maximum possible deceleration even after the activation of the operation of the brake starts.

The electronic control unit may control the warning unit to inform the driver that the PDCMS function is in an available state.

The warning unit may include a display unit visually informing the collision of the pedestrian with the vehicle or a speaker unit audibly informing the collision of the pedestrian with the vehicle.

The PDCMS function may further include an operation of a rear brake lamp.

The PDCMS function may further include an operation of an electrical stability control (ESC).

In accordance with another aspect of the present disclosure, a method for activating a pedestrian detection and collision mitigation system (PDCMS) of a vehicle includes: acquiring an image in front of the vehicle; setting a region of interest (ROI) corresponding to a size of an object in the image; extracting a pedestrian candidate based on an operation of the object in the set ROI; including a database and comparing the extracted pedestrian candidate with a posture of a sample pedestrian in the database to identify whether the extracted pedestrian candidate corresponds to the pedestrian on a driving lane of the vehicle, and detecting, by a front detection sensor, gaze information of the pedestrian and a distance and a relative speed between the pedestrian and the vehicle; detecting, by a vehicle sensor, at least any one of a speed, an acceleration, a steering angle, a steering angular velocity, or a pressure of a master cylinder of the vehicle; and activating a PDCMS function based on information detected by the front detection sensor and the vehicle sensor, in which the PDCMS function may include an activation of an operation of a warning unit operated to inform a driver of a collision of the pedestrian with the vehicle and an activation of an operation of a brake regardless of whether the driver operates the brake and the activation of the operation of the warning unit and the activation of the operation of the brake may be performed in order of the operation of the warning unit, a partial braking of the vehicle, and a full braking of the vehicle.

BRIEF DESCRIPTION OF THE DRAWINGS

The above and other objects, features and other advantages of the present disclosure will be more clearly understood from the following detailed description taken in conjunction with the accompanying drawings, in which:

FIG. 1 is a diagram illustrating a schematic concept of a PDCMS;

FIG. 2 is a block diagram illustrating a change in a PDCMS state according to a vehicle;

FIG. 3 is a block diagram schematically illustrating an apparatus for activating a PDCMS of a vehicle according to an embodiment of the present disclosure;

FIG. 4 is a configuration diagram of a front detection sensor according to an embodiment of the present disclosure;

FIG. 5 is an exemplified diagram illustrating ROI setting according to an embodiment of the present disclosure;

FIG. 6 is an exemplified view for identifying gaze information of the front detection sensor according to an embodiment of the present disclosure;

FIG. 7 is a diagram illustrating a concept of a pedestrian moving speed;

FIG. 8 is a diagram illustrating an example of a mapping table for activating a PDCMS function according to the embodiment of the present disclosure;

FIG. 9 is a diagram illustrating an example of the operation of the PDCMS function according to the embodiment of the present disclosure;

FIGS. 10A-10C are exemplified views illustrating the operation of the PDCMS function when the gaze information is the front according to the embodiment of the present disclosure;

FIGS. 11A-11D are exemplified views illustrating the operation of the PDCMS function when the gaze information is the diagonal according to the embodiment of the present disclosure;

FIGS. 12A-12C are exemplified views illustrating the operation of the PDCMS function when the gaze information is the rear according to the embodiment of the present disclosure;

FIGS. 13A-13C are exemplified views illustrating the operation of the PDCMS function when the gaze information is the side according to the embodiment of the present disclosure; and FIG. 14 is a flow chart illustrating a flow of a method for activating a PDCMS function according to an embodiment of the present disclosure.

DETAILED DESCRIPTION

Hereinafter, exemplary embodiments of the present disclosure will be described in detail with reference to the accompanying drawings so that those skilled in the art may easily practice the present disclosure. As those skilled in the art would realize, the described embodiments may be modified in various different ways, all without departing from the spirit or scope of the present disclosure.

A part irrelevant to the description will be omitted to clearly describe the present disclosure, and the same elements will be designated by the same reference numerals throughout the specification.

Throughout the present specification, when any one part is referred to as being "connected to" another part, it means that any one part and another part are "directly connected to" each other or are "electrically connected to" each other with the other part interposed therebetween. Further, unless explicitly described to the contrary, "comprising" any components will be understood to imply the inclusion of other components rather than the exclusion of any other components.

The mention that any portion is present "over" another portion means that any portion may be directly formed on another portion or a third portion may be interposed between one portion and another portion. In contrast, the mention that any portion is present "just over" another portion means that a third portion may not be interposed between one portion and another portion.

Terms used throughout the specification, 'first', 'second', 'third', etc. may be used to describe various portions, components, regions, layers, and/or sections but are not limited thereto. These terms are used only to differentiate any portion, component, region, layer, or section from other portions, components, regions, layers, or sections. Therefore, a first portion, component, region, layer, or section which will be described below may be mentioned as a second portion, component, region, layer, or section without departing from the scope of the present disclosure.

Terminologies used herein are to mention only a specific exemplary embodiment, and does not limit the present disclosure. Singular forms used herein include plural forms as long as phrases do not clearly indicate an opposite meaning. A term "including" used in the present specification concretely indicates specific properties, regions, integer numbers, steps, operations, elements, and/or components, and is not to exclude presence or addition of other specific properties, regions, integer numbers, steps, operations, elements, components, and/or a group thereof.

The term expressing the relative space of "under", "over", and the like may be used to more easily describe the relationship between other portions of one portion which is illustrated in the drawings. The terms intend to include other meanings or operations of apparatuses which are being used along with the intended meaning in the drawings. For example, overturning the apparatus in the drawings, any portions described as being positioned "under" other portions will be described as being positioned "over" other portions. Therefore, the exemplified term "under" includes both of the up and down directions. An apparatus may rotate by 90° or may rotate at different angles and the term expressing a relative space is interpreted accordingly.

All terms including technical terms and scientific terms used herein have the same meaning as the meaning generally understood by those skilled in the art to which the present disclosure pertains unless defined otherwise. Terms defined in a generally used dictionary are additionally interpreted as having the meaning matched to the related art document and the currently disclosed contents and are not interpreted as ideal or formal meaning unless defined.

FIG. 1 is a diagram illustrating a schematic concept of a PDCMS.

The PDCMS is a technology that warns a driver of a pedestrian collision when a collision of a pedestrian with a vehicle is expected and automatically activates an emergency brake.

Referring to FIG. 1, it is determined whether the PDCMS is operated based on an operation determination of a pedestrian and an operation determination of a vehicle. When the operation of the PDCMS is determined, the PDCMS function is performed by issuing a warning to driver and activating a vehicle control.

A system designer may design the PDCMS function to operate solely in the risk of collision of a pedestrian with a vehicle or may design the PDCMS function to operate in combination with other driving assistance systems.

FIG. 2 is a block diagram illustrating a change in a PDCMS state according to a vehicle.

In a PDCMS off state, no action is taken on the operation of the vehicle. The PDCMS off state is produced when an engine of a vehicle stalls.

In the PDCMS deactivation state, the apparatus for activating a PDCMS monitors a speed of a vehicle and determine whether the PDCMS is in an appropriate state to activate. The PDCMS deactivation state is produced by turning on the engine in the PDCMS off state. Further, the PDCMS deactivation state is produced even when the vehicle is in a state other than the conditions that the vehicle is activated from the PDCMS activation state. For example, when the speed of the vehicle falls below a predetermined value Vmin, the PDCMS deactivation state is produced.

The PDCMS activation state is produced when the speed of the vehicle is equal to or greater than the predetermined value Vmin and equal to or less than a predetermined value Vmax. To determine whether to operate the PDCMS function in the PDCMS activation state, an operation of a pedestrian and an operation of a vehicle are monitored. When the apparatus for activating a PDCMS determines that the PDCMS function needs to be operated, the PDCMS function starts. The PDCMS function includes a collision warning to a driver and an operation of an emergency brake or optionally includes braking actions by a driver.

FIG. 3 is a block diagram schematically illustrating an apparatus for activating a PDCMS of a vehicle according to an embodiment of the present disclosure.

Referring to FIG. 3, an apparatus 100 for activating a PDCMS of a vehicle according to an embodiment of the present disclosure includes a front detection sensor 200, a vehicle sensor 300, an electronic control unit 400, and a warning unit 500.

The front detection sensor 200 may accurately recognize a pedestrian by setting a region of interest (ROI) in an image in front of a vehicle acquired through a camera. A method for determining a pedestrian based on the ROI setting of the front detection sensor 200 according to the embodiment of the present disclosure will be described in detail with reference to FIG. 4. The front detection sensor 200 may extract characteristics of obstacles detected in front of the vehicle to identify objects and detect various objects such as vehicles on a roadside as well as pedestrians. The front detection sensor 200 may detect even parts configuring a pedestrian as well as the overall appearance of the pedestrian to detect the pedestrian even when only a part of the pedestrian covered by various objects such as vehicles on a roadside is detected. Further, the front detection sensor 200 may detect gaze information of a pedestrian and a distance and a relative speed between a pedestrian and a vehicle when an object in front of the vehicle is determined as the pedestrian. The front detection sensor 200 transmits the detected information on the pedestrian to the electronic control unit 400.

The vehicle sensor 300 measures revolutions per minute (RPM) of a vehicle wheel from a vehicle engine and calculates a driving speed of a vehicle based on the known circumference of the wheel and the measured RPM and time. Further, the vehicle sensor 300 may detect information on driving conditions of a vehicle such as an acceleration, a steering angle, a steering angular speed, and a pressure of a master cylinder. Further, the vehicle sensor 300 may also detect information on driving environment of a vehicle by including a rain sensor, a temperature sensor, an illuminance sensor, etc. The vehicle sensor 300 may transmit the information on the detected driving conditions and driving environment of the vehicle to the electronic control unit 400.

The electronic control unit 400 determines whether to operate the PDCMS function of the vehicle based on the information received from the front detection sensor 200 and the vehicle sensor 300. Specifically, the electronic control unit 400 determines whether the conditions that the PDCMS function may be operated are satisfied by combining the pedestrian state and the vehicle state. That is, the electronic control unit 400 determines the risk of collision between a vehicle and a pedestrian using a current position of the pedestrian, a current position of the vehicle, and speed information on the vehicle if it is determined that an obstacle is the pedestrian. For example, if the distance between the pedestrian and the vehicle is below a predetermined distance and the motion direction of the pedestrian is the same as the movement direction of the vehicle, it is determined that the conditions that the PDCMS function may be operated are satisfied because the collision is highly likely to occur and if the distance between the pedestrian and the vehicle is below a predetermined distance but the motion direction of the pedestrian differs from the movement direction of the vehicle, it is determined that the conditions that the PDCMS function may be operated are not satisfied because the collision is less likely to occur.

Preferably, the electronic control unit 400 determines whether the conditions that the PDCMS function may be operated are satisfied based on the mapping table. The mapping table will be described below with reference to FIG. 6.

If the electronic control unit 400 determines that the pedestrian state and the vehicle state satisfy the conditions that the PDCMS function may start, the PDCMS function of the vehicle is operated. The PDCMS function includes operating the warning unit 500 to warn the driver of the collision of the pedestrian with the vehicle or operating the brake without the operation of the driver.

Warning the driver of the collision of the pedestrian with the vehicle is performed by operating the warning unit 500. The warning unit 500 is operated by the control of the electronic control unit 400. The warning unit 500 may include a display unit or a speaker unit. The display unit included in the warning unit 500 may provide a driver with a visual warning through a head-up display, a navigation display, etc. The speaker unit included in the warning unit 500 may provide a driver with an audible warning through an audio. The content of the warning that the warning unit 500 performs is that there is a potential risk of collision of the pedestrian with the vehicle since obstacles exist in the front of a driving lane of the vehicle.

The activation of the operation of the brake regardless of whether the driver operates the brake is performed only by the control of the electronic control unit 400 without the operation of the driver. The activation of the operation of the brake is to automatically reduce the relative speed between the vehicle and the pedestrian if it is found that the pedestrian collision is just around the corner.

The activation of the operation of the brake is performed so that the speed of the vehicle may be reduced to at least a predetermined speed or more from the time when the operation of the brake is activated to the time when the collision of the pedestrian with the vehicle occurs. Preferably, the predetermined speed may be 20 km/h.

Further, even after the activation of the operation of the brake starts, the driver manually operates the brake, thereby performing the maximum possible deceleration. That is, the driver may manually operate the brake so that the speed of the vehicle is reduced more than the predetermined speed. For example, the driver may manually operate the brake so that the speed of the vehicle is maximally decelerated to 20 km/h or more that is the predetermined speed.

In addition, the electronic control unit 400 may inform a driver that the PDCMS function is in an available state. Specifically, the electronic control unit 400 may control the warning unit 500 to inform the driver that the PDCMS function is in the available state through the display unit or the speaker unit of the warning unit 500.

In addition, the PDCMS function may control an operation of a brake lamp to prevent the potential risk of collision with the following vehicles.

In addition, the PDCMS function may further include an operation of an electrical stability control (ESC). The ESC is an apparatus that allows a vehicle itself to intervene in an operation of a brake in an emergency situation such as an oversteer (when a vehicle enters inwardly beyond a turning radius of a road) or an understeer (when a vehicle deviates outwardly beyond the turning radius of the road) of a vehicle to thereby help a driver to escape from an emergency situation.

FIG. 4 is a configuration diagram of a front detection sensor according to an embodiment of the present disclosure.

Referring to FIG. 4, the front detection sensor 200 according to the embodiment of the present disclosure includes an image input processor 210 a region of interest (ROI) setting processor 220, a candidate extraction processor 230, a pedestrian determination processor 240, and a pedestrian tracking processor 250.

Each unit configuring the front detection sensor 200 may be controlled by the electronic control unit 400.

The image input processor 210 receives an image acquired by a camera that photographs a front of a vehicle. The ROI setting processor 220 sets an ROI corresponding to a size of an object in an image in front of a vehicle received through the image input processor 210. That is, the ROI setting processor 220 uses a size of the image, installation environment information of the camera, specifications of the camera, and an actual size of a pedestrian to determine a floor position of a pedestrian area in the image. Therefore, since the pedestrian may be identified based on the number of pixels, the ROI setting processor 220 may set the minimum and maximum size of the pedestrian from the floor position of the pedestrian area to be an appropriate ROI.

FIG. 5 is an exemplified diagram illustrating ROI setting according to an embodiment of the present disclosure.

Referring to FIG. 5, the installation environment information of the front detection sensor 200 may be expressed by the following Equation 1.

$$H_{P\_I}(i) = \frac{\psi_P(i)}{\theta_V} \times H_I \quad \text{[Equation 1]}$$

$$\psi_P(i) = \phi_{PT}(i) - \phi_{PB}(i)$$

$$\phi_{PT}(i) = \begin{cases} \arctan\left(\frac{H_{P\_R} - H_C}{D_P(i)}\right) + 90° & \text{if } H_C < H_{P\_R} \\ 90° - \arctan\left(\frac{H_C - H_{P\_R}}{D_P(i)}\right) & \text{otherwise} \end{cases}$$

$$D_P(i) = \tan(\phi_{PB}(i)) \times H_C$$

$$\phi_{PB}(i) = i \times \frac{\theta_V}{H_I} + \theta_{IB}$$

$$\theta_{IB} = \arctan\left(\frac{D_{IB}}{H_C}\right)$$

In the above Equation 1, the respective symbols have the following meanings.

i: Floor position of the pedestrian area in the image
$H_{P\_I}$: Size (height) of the pedestrian area in the image
$\psi_P$: Angle in a vertical direction which is occupied by the pedestrian
$H_I$: Size (height) of the input image
$\phi_{PT}$: Angle up to a crown of a pedestrian's head
$\phi_{PB}$: Angle up to a tip of a pedestrian's toe
$H_{P\_R}$: Size (height) of the pedestrian
$D_P$: Distance up to the pedestrian
$H_C$: Height at which the camera is installed
$\theta_V$: Angle in a vertical direction of the camera $\theta_{IB}$: Angle up to an actual position corresponding to a starting point of the image $D_{IB}$: Distance up to an actual position corresponding to the starting point of the image The candidate extraction processor 230 extracts a pedestrian candidate based on an operation of an object having the ROI set by the ROI setting processor 220.

The pedestrian determination processor 240 identifies the pedestrian by comparing the pedestrian candidate extracted by the candidate extraction processor 230 with a posture of a sample pedestrian in a pedestrian feature database.

Although not illustrated, the pedestrian determining unit 240 includes a database for storing, as the posture of the sample pedestrian, information associated with front, back, left, and right portions, an upper left half of a body, or an upper right half of a body of the sample pedestrian.

Therefore, the pedestrian determination processor 240 compares the features of the pedestrian candidate extracted by the candidate extraction processor 230 with the posture of the sample pedestrian stored in the database sequentially, for example, in a cascade manner, thereby determining whether the extracted pedestrian candidate corresponds to a pedestrian.

For example, it is preferable that the postures of the sample pedestrian in the database which are compared with the features of the extracted pedestrian candidate are in the order of the front, back, left, and right portions, the upper left half of the body, and the upper right part of the body of the sample pedestrian However, the postures are not necessarily limited to the order.

The pedestrian tracking processor 250 may track the pedestrian identified by the pedestrian determination processor 240. For example, the pedestrian tracking processor 250 tracks the pedestrian based on the number of feature points of the pedestrian in the ROI. The front detection sensor 200 may detect the gaze information of the pedestrian and the distance and the relative speed between the pedestrian and the vehicle by the tracking of the pedestrian tracking processor 250.

FIG. 6 is an exemplified view for identifying gaze information of the front detection sensor according to an embodiment of the present disclosure.

The front detection sensor 200 according to the embodiment of the present disclosure may detect the gaze information of the pedestrian and reflect the detected gaze information to the operation of the PDCMS of the electronic control unit 400.

In order to detect the gaze information of the pedestrian, the front detection sensor 200 sets a horizontal length of the entire face of the pedestrian to be x, a horizontal length from a left face contour to a left eye to be $x_1$, a horizontal length from a right face contour to a right eye to be $x_2$, and a horizontal length between the left eye and the right eye to be $x_3$ and then detects the gaze information of the pedestrian.

Specifically, the gaze information of the pedestrian corresponds to the front or the diagonal if $|(x_1-x_2)/x|<a$, the rear if $x_1=x_2=x_3=0$, and the side if $|(x_1-x_2)/x|\geq a$ or $x_1=0$ or $x_2=0$, in which the a may be selected in the range between 0.65 and 0.95.

The front detection sensor 200 transmits the detected gaze information of the pedestrian to the electronic control unit 400. The method for reflecting the gaze information of the pedestrian received by the electronic control unit 400 to the operation of the PDCMS will be described with reference to FIGS. 10 to 13.

FIG. 7 is a diagram illustrating a concept of a pedestrian moving speed;

Referring to FIG. 7, the front detection sensor 200 may detect a distance between a pedestrian 600 and a vehicle 700 that are moving within a driving lane and a moving speed of the pedestrian 600.

For example, if the pedestrian 600 moves from the left to the right with respect to a front view of the vehicle 700, the pedestrian 600 has a negative (−) moving speed and if the pedestrian 600 moves from the right to left with respect to the front view of the vehicle 700, the pedestrian 600 has a positive (+) moving speed.

In addition, the front detection sensor 200 may detect the distance between the vehicle 700 and the pedestrian 600 moving on the driving lane of the vehicle.

FIG. 8 is a diagram illustrating an example of a mapping table for activating a PDCMS function according to the embodiment of the present disclosure.

The electronic control unit 400 uses the mapping table to determine the risk of collision of the pedestrian with the vehicle, and furthermore, whether the PDCMS function is operated.

Referring to FIG. 8, the electronic control unit 400 determines the operation of the PDCMS function based on an initial speed at a boundary of a driving lane on which the pedestrian moves and an initial speed of the vehicle.

Specifically, if an absolute value of the initial speed at the boundary of the driving lane on which the pedestrian is moving and the initial speed of the vehicle are in an area in which the PDCMS function is essentially operated at the time of determining whether the PDCMS function is operated, the electronic control unit 400 determines that the PDCMS function is operated. The operation possible area means the area in which the Vmin or the Vmax may be adjusted according to the selection of the manufacturer.

For example, if the speed of the vehicle falls below 8.4 m/s (30 km/h) as the Vmin or rises above 16.6 m/s (60 km/h) as the Vmax, then the electronic control unit 400 may determine that the PDCMS is in the deactivation state and thus the PDCMS function is not operated.

Further, when the initial speed of the vehicle is between the Vmin and the Vmax and the absolute value of the initial speed at the boundary of the driving lane on which the pedestrian moves is between 0.83 m/s and 1.5 m/s, the electronic control unit 400 may determine that the PDCMS function is operated.

FIG. 9 is a diagram illustrating an example of the operation of the PDCMS function according to the embodiment of the present disclosure. A vertical axis represents the TTC derived from the distance and the relative speed between the vehicle and the pedestrian and a horizontal axis represents the operation of the PDCMS function of the vehicle.

The electronic control unit 400 performs the PDCMS operation by steps according to the distance between the vehicle and the pedestrian.

That is, when $t_1>t_2>t_3$ for $t_1$, $t_2$, and $t_3$ which are different TTCs, if the TTC of the vehicle and the pedestrian is $t_1$, the warning is issued to the driver through the warning unit 500, if the TTC of the vehicle and the pedestrian is $t_2$, the vehicle is partially braked, and if the TTC of the vehicle and the pedestrian is $t_3$, the vehicle is fully braked.

The warning of the warning unit 500 may include the visual warning through the display unit or the audible warning through the speaker unit.

The partial braking means reducing the speed of the vehicle to at least a predetermined speed or more and the full braking means maximally reducing the speed of the vehicle.

However, even after the PDCMS function is operated, the driver may manually operate the brake to perform the maximum possible deceleration. That is, the driver may manually operate the brake to reduce the speed of the vehicle more than the sequential deceleration according to the PDCMS function.

FIGS. 10 to 13 illustrate the method for applying the gaze information of the pedestrian received from the front-side sensor 200 to the operation of the PDCMS function for performing the sequential deceleration of the electronic control unit 400.

When the pedestrian recognizes the driving direction of the vehicle, the pedestrian is less likely to move to the inside of the route of the vehicle is low and the possibility of collision is reduced accordingly. However, when the gaze direction of the pedestrian is not taken into consideration, the gaze of the pedestrian is directed toward the front of the vehicle, and therefore it is likely to activate the warning and the operation of the brake due to the unnecessary operation of the PDCMS function even in the situation that the pedestrian recognizes the driving direction of the vehicle and the possibility of collision is low.

The unnecessary operation of the PDCMS function causes the driver to experience the sense of difference and the discomfort. This is directly connected to the commerciality of the vehicle, which is a big problem for car makers.

Therefore, if the possibility of collision is determined according to the gaze direction of the pedestrian and the operating time of the PDCMS function is controlled, the essential purpose of the PDCMS for protecting the pedestrian may be achieved and the reduction in the ride comfort of the driver may be prevented.

FIGS. 10A-10C are exemplified views illustrating the operation of the PDCMS function when the gaze information is the front according to the embodiment of the present disclosure.

As described above with reference to FIG. 6, the horizontal length of the entire face of the pedestrian is x, the horizontal length from the left face contour to the left eye is defined as $x_1$, the horizontal length from the right face contour to the right eye is defined as $x_2$, the horizontal length between the left eye and the right eye is defined as $x_3$.

If the gaze of the pedestrian is directed toward the front of the vehicle, it corresponds to the case where $|(x_1-x_2)/x|<a$. Therefore, if it corresponds to $|(x_1-x_2)/x|<a$ based on the lengths of each part of the face of the pedestrian derived from the front detection sensor 200, it may be determined that the gaze of the pedestrian is directed toward the front of the vehicle.

In this case, since the vehicle exists within the view of the pedestrian, it is expected that the possibility of collision is low because the pedestrian recognizes the driving direction of the vehicle. Therefore, the electronic control unit 400 may delay the warning of the driver and the partial braking by a predetermined time from the initially set times $t_1$ and $t_2$ as illustrated in FIG. 9 during the operating time of the PDCMS function. Alternatively, the electronic control unit 400 may delay all of the warning of the driver, the partial braking, and the full braking by a predetermined time from all of the initially set times $t_1$, $t_2$, and $t_3$ as illustrated in FIG. 9 during the operating time of the PDCMS function.

FIG. 11 is an exemplified view illustrating the operation of the PDCMS function when the gaze information is the diagonal according to the embodiment of the present disclosure.

If the gaze of the pedestrian is directed toward the diagonal of the vehicle, it corresponds to the case where $|(x_1-x_2)/x|<a$ like the case where the gaze of the pedestrian is the front of the vehicle. Therefore, if the gaze of the pedestrian corresponds to $|(x_1-x_2)/x|<a$ based on the lengths of each part of the face of the pedestrian derived from the front detection sensor 200, it may be determined that the gaze of the pedestrian is directed toward the diagonal of the vehicle.

In this case, since the vehicle exists within the view of the pedestrian, it is expected that the possibility of collision is low because the pedestrian recognizes the driving direction of the vehicle. Therefore, the electronic control unit 400 may delay the warning of the driver and the partial braking by a predetermined time from the initially set times $t_1$ and $t_2$ as illustrated in FIG. 9 during the operating time of the PDCMS function. Alternatively, the electronic control unit 400 may delay all of the warning of the driver, the partial braking, and the full braking by a predetermined time from all of the initially set times $t_1$, $t_2$, and $t_3$ as illustrated in FIG. 9 during the operating time of the PDCMS function.

FIG. 12 is an exemplified view illustrating the operation of the PDCMS function when the gaze information is the rear according to the embodiment of the present disclosure.

If the gaze direction of the pedestrian is in the same direction as the driving direction of the vehicle, that is, if the vehicle is driving toward the rear of the pedestrian, it corresponds to $x_1=x_2=x_3=0$. Therefore, if it corresponds to $|(x_1-x_2)/x|<a$ based on the lengths of each part of the face of the pedestrian derived from the front detection sensor 200, it may be determined that the gaze direction of the pedestrian is the same as the driving direction of the vehicle, that is, the vehicle is driving toward the rear of the vehicle.

In this case, since the vehicle exists within the view of the pedestrian, it is expected that the possibility of collision is high because the pedestrian does not recognize the driving direction of the vehicle. Therefore, the electronic control unit 400 may not delay the operating time of the PDCMS function from the initially set times $t_1$, $t_2$, and $t_3$ as illustrated in FIG. 9.

FIG. 13 is an exemplified view illustrating the operation of the PDCMS function when the gaze information is the side according to the embodiment of the present disclosure.

If the gaze direction of the pedestrian forms about 90° with respect to the driving direction of the vehicle, that is, if the vehicle is driving toward the side of the pedestrian, it corresponds to the case where $|(x_1-x_2)/x|\geq a$ or $x_1=0$ or $x_2=0$. Therefore, if it corresponds to $|(x_1-x_2)/x|\geq a$ or $x_1=0$ or $x_2=0$ based on the lengths of each part of the face of the pedestrian derived from the front detection sensor 200, it may be determined that the gaze direction of the pedestrian forms about 90° with respect to the driving direction of the vehicle, that is, the vehicle is driving toward the side of the vehicle.

In this case, since the possibility that the vehicle does not exist within the view of the pedestrian is significant, it is expected that the possibility of collision is high because the pedestrian does not recognize the driving direction of the vehicle. Therefore, the electronic control unit 400 may not delay the operating time of the PDCMS function from the initially set times $t_1$, $t_2$, and $t_3$ as illustrated in FIG. 9.

FIG. 14 is a flow chart illustrating a flow of a method for activating a PDCMS function according to an embodiment of the present disclosure.

Referring to FIG. 14, a method for activating a pedestrian detection and collision mitigation system (PDCMS) function according to an embodiment of the present disclosure includes: acquiring an image in front of a vehicle (S100); setting a region of interest (ROI) corresponding to a size of an object in the image (S200); extracting a pedestrian candidate based on an operation of the object in the set ROI (S300); including a database and comparing the extracted pedestrian candidate with a posture of a sample pedestrian in the database to identify whether the extracted pedestrian candidate corresponds to a pedestrian on a driving lane of the vehicle (S400); detecting, by the front detection sensor, gaze information of the pedestrian and a distance and a relative speed between the pedestrian and the vehicle (S500); detecting, by a vehicle sensor, at least one of a speed, an acceleration, a steering angle, a steering angular velocity, and a pressure of a master cylinder of the vehicle (S600); and operating the PDCMS function based on the information detected by the front detection sensor and the vehicle sensor (S700).

In the acquiring of the image in front of the vehicle (S100), the image is acquired by the camera photographing the front of the vehicle.

In the setting of the region of interest (ROI) corresponding to the size of the object in the image (S200), the ROI corresponding to the size of the object in the image in front of the vehicle acquired in the step S100 is set. That is, the ROI setting processor 220 uses the size of the image, the installation environment information of the camera, the specifications of the camera, and the actual size of the pedestrian to determine the floor position of the pedestrian area in the image. Therefore, since the pedestrian may be identified based on the number of pixels, the ROI setting processor 220 may set the minimum and maximum size of the pedestrian from the floor position of the pedestrian area to be an appropriate ROI.

In the extracting of the pedestrian candidate based on the operation of the object in the set ROI (S300), the pedestrian candidate is extracted based on the operation of the object having the set ROI in the image.

The including of the database and the comparing of the extracted pedestrian candidate with the posture of the sample pedestrian in the database to identify whether the extracted pedestrian candidate corresponds to the pedestrian on the driving lane of the vehicle (S400), the features of the extracted pedestrian candidate are compared with the posture of the sample pedestrian stored in the database sequentially, for example, in the cascade manner to determine whether the extracted pedestrian candidate corresponds to the pedestrian.

In the detecting of, by the front detection sensor, the gaze information of the pedestrian and the distance and the relative speed between the pedestrian and the vehicle (S500), the gaze information of the pedestrian and the distance and the relative speed between the pedestrian and the vehicle are detected by tracking the pedestrian based on the number of feature points of the pedestrian in the ROI.

In the detecting of, by the vehicle sensor, the vehicle information including at least one of the speed, the acceleration, the steering angle, the steering angular velocity, and the pressure of the master cylinder of the vehicle (S600), the vehicle sensor measures the RPM of the vehicle wheel based on the vehicle engine and calculates the RPM of the vehicle based on the known circumference of the wheel and the measured RPM and time to detect the information on the driving conditions of the vehicle such as the acceleration, the steering angle, the steering angular velocity, and the pressure of the master cylinder.

In the operating of the PDCMS function based on the information detected by the front detection sensor and the vehicle sensor (S700), it is determined whether the conditions that the PDCMS function may be operated are satisfied by combining the pedestrian state and the vehicle state. For example, it is determined whether the conditions that the PDCMS function on the mapping table may be operated are satisfied based on the combination of the pedestrian state and the vehicle state. That is, if it is determined that an obstacle is a pedestrian, the risk of collision of the pedestrian with the vehicle is determined on the mapping table using the current position of the pedestrian, the current position of the vehicle, and the speed information of the vehicle.

Further, if it is determined that the pedestrian state and the vehicle state satisfy the conditions that the PDCMS function may be started, the PDCMS function of the vehicle is operated. The PDCMS function includes the activation of the operation of the warning unit that is operated to inform the driver of the collision of the pedestrian with the vehicle and the operation of the brake regardless of whether the driver operates the brake. The activation of the operation of the warning unit and the activation of the operation of the brake are performed in order of the operation of the warning unit, the partial braking of the vehicle, and the full braking of the vehicle.

Meanwhile, it should be understood that the PDCMS was described as an example for convenience of description in the present specification. As described above, it should be understood that the PDCMS is only one of several ADAS functions, and that the PDCMS implementations presented by the present disclosure may also be used to implement other ADAS functions involved. For example, the system presented by the present disclosure may be applied to implement one or a combination of ones of the ADAS functions such as the PDCMS, a lane change decision aid system (LCDAS), a land departure warning system (LDWS), an adaptive cruise control (ACC), a lane keeping assistance system (LKAS), a road boundary departure prevention system (RBDPS), a curve speed warning system (CSWS), a forward vehicle collision warning system (FVCWS), and low speed following (LSF).

The apparatus for activating a PDCMS according to the embodiment of the present disclosure may accurately determine the pedestrian based on the posture information of the pedestrian in the image in front of the vehicle.

Further, the vehicle braking control may be performed while being delayed by the predetermined time only when the pedestrian may recognize the vehicle based on the gaze information of the pedestrian.

Therefore, the apparatus for activating a PDCMS according to the embodiment of the present disclosure may more accurately detect the pedestrian to effectively protect the pedestrian and optimize the vehicle braking control unnecessarily frequently performed to resolve the sense of difference and discomfort of the driver, thereby improving the commerciality of the vehicle.

The foregoing includes examples of one or more embodiments. Of course, all possible combinations of components or methods for the purpose of describing the embodiments described above are not described, but those skilled in the art may recognize that many combinations and substitutions of various embodiments are possible. Accordingly, the described embodiments are intended to embrace all the alternatives, modifications and variations that fall within the spirit and scope of the appended claims. Moreover, in connection with the extent that the term "include" in the detailed description or the appended claims is used, the term are intended to be inclusive in a manner similar to "consisting" as interpreted when the term "configured" is used as a transitional word in the appended claim.

What is claimed is:

1. An apparatus for activating a pedestrian detection and collision mitigation system (PDCMS) of a vehicle, the apparatus comprising:

a front detection sensor configured to detect a presence of a pedestrian, gaze information of the pedestrian, and a distance and a relative speed between the pedestrian and the vehicle;
a vehicle sensor configured to detect a speed of the vehicle;
a controller configured to determine the vehicle is in a PDCMS activation state and to operate a PDCMS function based on information detected by the front detection sensor and the vehicle sensor when the vehicle is in the PDCMS activation state; and
an output device configured to provide a warning of a collision of the pedestrian with the vehicle by a control of the controller,
wherein the PDCMS function includes at least one of an operation of the output device or an operation of a brake regardless of whether the driver operates the brake,
wherein the controller determines a time of activation of the PDCMS based on the gaze information of the pedestrian, and
wherein the controller determines that the vehicle is in the PDCMS activation state if a speed of the pedestrian and the speed of the vehicle are in an area in which the PDCMS function is essentially operated at the time of determining whether the PDCMS function is operated.

2. The apparatus of claim 1, wherein the front detection sensor tracks the pedestrian when the presence of the pedestrian is detected.

3. The apparatus of claim 2, wherein the front detection sensor tracks the pedestrian based on a number of feature points of the pedestrian in an acquired image.

4. The apparatus of claim 1,
wherein when a horizontal length of the entire face of the pedestrian is defined as x, a horizontal length from a left face contour to a left eye of the pedestrian is defined as $x_1$, a horizontal length from a right face contour to a right eye of the pedestrian is defined as $x_2$, and a horizontal length between the left eye and the right eye of the pedestrian is defined as $x_3$, the gaze information of the pedestrian corresponds to a front or a diagonal if $|(x_1-x_2)/x|<a$, a rear if $x_1=x_2=x_3=0$, and a side if $|(x_1-x_2)/x|\geq a$ or $x_1=0$ or $x_2=0$, and the a is selected in a range between 0.65 and 0.95.

5. The apparatus of claim 4, wherein the controller performs the operation of the output device and the operation of the brake by delaying the operation of the output device and the operation of the brake by a predetermined time when the gaze information of the pedestrian is the front or the diagonal, compared to when the gaze information of the pedestrian is the rear or the side.

6. The apparatus of claim 1, wherein the vehicle sensor further includes at least any one of a rain sensor, a temperature sensor, and an illumination sensor.

7. The apparatus of claim 1, wherein the controller performs the operation of the brake so that the speed of the vehicle is reduced to at least a predetermined speed or more from time when the operation of the brake is activated to time when the collision of the pedestrian with the vehicle occurs.

8. The apparatus of claim 1, wherein the controller permits the driver to operate the brake for a maximum possible deceleration even after the activation of the operation of the brake starts.

9. The apparatus of claim 1, wherein the controller controls the output device to provide an alarm indicating that the PDCMS function is in an available state.

10. The apparatus of claim 1, wherein the output device includes a display visually providing the warning of the collision of the pedestrian with the vehicle or a speaker audibly providing the warning of the collision of the pedestrian with the vehicle.

11. The apparatus of claim 1, wherein the PDCMS function further includes an operation of a rear brake lamp.

12. The apparatus of claim 1, wherein the PDCMS function further includes an operation of an electrical stability control (ESC).

13. A method for activating a pedestrian detection and collision mitigation system (PDCMS) of a vehicle, the method comprising:
acquiring, by a front detection sensor, an image in front of the vehicle;
detecting, by the front detection sensor, presence of a pedestrian, a gaze information of the pedestrian and a distance and a relative speed between the pedestrian and the vehicle;
detecting, by a vehicle sensor, a speed of the vehicle;
determining, by a controller, the vehicle is in a PDCMS activation state; and
operating, by the controller, a PDCMS function based on information detected by the front detection sensor and the vehicle sensor when the vehicle is in the PDCMS activation state,
wherein the PDCMS function includes an operation of an output device to provide a driver a warning of a collision of the pedestrian with the vehicle and an operation of a brake regardless of whether the driver operates the brake, and
wherein the method further includes
determining, by the controller, a time of activation of the PDCMS based on the gaze information of the pedestrian
determining, by the controller, that the vehicle is in the PDCMS activation state if a speed of the pedestrian and the speed of the vehicle are in an area in which the PDCMS function is essentially operated at the time of determining whether the PDCMS function is operated.

14. The apparatus of claim 1, wherein the controller determines that the vehicle is in the PDCMS activation state if the speed of the vehicle is within a first speed range and the speed of the pedestrian is within a second speed range.

15. The method of claim 13, wherein the method further includes:
determining, by the controller, that vehicle is in the PDCMS activation state, if the speed of the vehicle is within a first speed rage and the speed of the pedestrian is within a second speed range.

* * * * *